United States Patent
Jovet

(10) Patent No.: US 12,442,567 B2
(45) Date of Patent: *Oct. 14, 2025

(54) THERMODYNAMIC HEAT RECOVERY WITHOUT AN ADDITIONAL THERMODYNAMIC CIRCUIT

(71) Applicant: Lennox Industries Inc., Richardson, TX (US)

(72) Inventor: Bastien Jovet, Peisey-Nancroix (FR)

(73) Assignee: Lennox Industries Inc., Richardson, TX (US)

( * ) Notice: Subject to any disclaimer, the term of this patent is extended or adjusted under 35 U.S.C. 154(b) by 49 days.

This patent is subject to a terminal disclaimer.

(21) Appl. No.: 18/512,106

(22) Filed: Nov. 17, 2023

(65) Prior Publication Data

US 2024/0085067 A1 Mar. 14, 2024

Related U.S. Application Data

(63) Continuation of application No. 17/159,497, filed on Jan. 27, 2021, now Pat. No. 11,859,875.

(51) Int. Cl.
*F25B 13/00* (2006.01)
*F25B 41/20* (2021.01)

(52) U.S. Cl.
CPC .............. *F25B 13/00* (2013.01); *F25B 41/20* (2021.01); *F25B 2313/02741* (2013.01); *F25B 2600/2513* (2013.01); *F25B 2700/21151* (2013.01)

(58) Field of Classification Search
CPC ...................... F25B 13/00; F25B 41/20; F25B 2313/02741; F25B 2600/2513; F25B 2700/21151
See application file for complete search history.

(56) References Cited

FOREIGN PATENT DOCUMENTS

| CN | 201311008 Y | 9/2009 |
| CN | 102705920 B | 2/2015 |
| JP | H08254345 A | * 10/1996 |
| JP | 2016105028 A | 6/2016 |
| WO | WO-2012152199 A1 | 11/2012 |

OTHER PUBLICATIONS

Yamoto, Air Conditioner, Jan. 10, 1996, JPH08254345A, Whole Document (Year: 1996).*
Lennox, "High Efficiency Packaged Air Treatment Unit," 4 pages.
Fujiware, Air Conditioner, Jul. 9, 2016, JP2016105028A, Whole Document.

* cited by examiner

*Primary Examiner* — Larry L Furdge

(57) ABSTRACT

A refrigerant circuit includes a compressor operable to compress a refrigerant, an expansion valve, an outdoor heat exchanger, an indoor heat exchanger in a fresh air inlet to a conditioned space, a recovery heat exchanger in an extracted air outlet from the conditioned space, and a reversing valve operable to direct a direction of refrigerant flow between a cooling mode and a heating mode.

19 Claims, 16 Drawing Sheets

THERMODYNAMIC HEAT RECOVERY WITHOUT AN ADDITIONAL THERMODYNAMIC CIRCUIT

CROSS-REFERENCE TO RELATED APPLICATIONS

This application is a continuation of U.S. patent application Ser. No. 17/159,497, filed on Jan. 27, 2021, now U.S. Pat. No. 11,859,875, issued Jan. 2, 2024, by Bastien Jovet, and entitled "THERMODYNAMIC HEAT RECOVERY WITHOUT AN ADDITIONAL THERMODYNAMIC CIRCUIT". U.S. patent application Ser. No. 17/159,497 is incorporated herein by reference.

TECHNICAL FIELD

This application relates generally to heating, ventilation, and air conditioning (HVAC) systems and more particularly, but not by way of limitation, to implementing thermodynamic heat recovery without utilizing a thermodynamic circuit in addition to the main cooling and heating thermodynamic circuit(s).

BACKGROUND

This section provides background information to facilitate a better understanding of the various aspects of the disclosure. It should be understood that the statements in this section of this document are to be read in this light, and not as admissions of prior art.

Thermodynamic vapor-compression systems are used to regulate environmental conditions within an enclosed space. Typically, such systems have a circulation fan that pulls air from the enclosed space through ducts and pushes the air back into the enclosed space through additional ducts after conditioning the air (e.g., heating or cooling). A refrigerant may flow in a circuit between two heat exchangers, typically coils. One heat exchanger may be "inside" the structure (the "indoor heat exchanger" or "indoor coil") and the other heat exchanger may be outside the structure (the "outdoor heat exchanger" or "outdoor coil"). For heating, the refrigerant may absorb heat as it passes through the outdoor heat exchanger and release heat as it passes through the indoor heat exchanger. For air conditioning, the refrigerant may absorb heat as it passes through the indoor heat exchanger and release heat as it passes through the outdoor heat exchanger. Heat pumps can reverse the direction of refrigerant flow, to change between heating and air conditioning. A reversing valve typically controls the direction of refrigerant flow.

Heat recovery can be implemented by recirculating conditioned air from the structure and/or by operation of a thermodynamic circuit in addition to the heat pump's refrigerant circuit. For example, a system may include a heat pump to cool or heat the conditioned space and an additional thermodynamic circuit for heat recovery. The additional thermodynamic circuit including an independent compressor and refrigerant circuit from the heat pump. The main interest of the thermodynamic heat recovery circuit is to reach a high efficiency with all the air going in the conditioned space taken from the external environment and is considered as "cleaner" than the air taken from the conditioned space. By "cleaner" is considered air with a lower $CO_2$ concentration, less particles and/or virus for instance.

SUMMARY

This summary is provided to introduce a selection of concepts that are further described below in the detailed description. This summary is not necessarily intended to identify key or essential features of the claimed subject matter, nor is it intended to be used as an aid in limiting the scope of claimed subject matter.

An exemplary refrigerant circuit includes a compressor operable to compress a refrigerant, an expansion valve, an outdoor heat exchanger, an indoor heat exchanger in a fresh air inlet to a conditioned space, a recovery heat exchanger in an extracted air outlet from the conditioned space, and a reversing valve operable to direct a direction of refrigerant flow between a cooling mode and a heating mode.

An exemplary method includes operating a refrigerant circuit in a cooling mode or a heating mode to condition an indoor air in a conditioned space, the refrigerant circuit comprising a compressor operable to compress a refrigerant, an expansion valve, an outdoor heat exchanger, an indoor heat exchanger in a fresh air inlet to the conditioned space, and a recovery heat exchanger in an extracted air outlet from the conditioned space, and recovering energy from the indoor air via the recovery heat exchanger.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Various embodiments will now be described more fully with reference to the accompanying drawings. The disclosure may, however, be embodied in many different forms and should not be construed as limited to the embodiments set forth herein.

Figure 1:
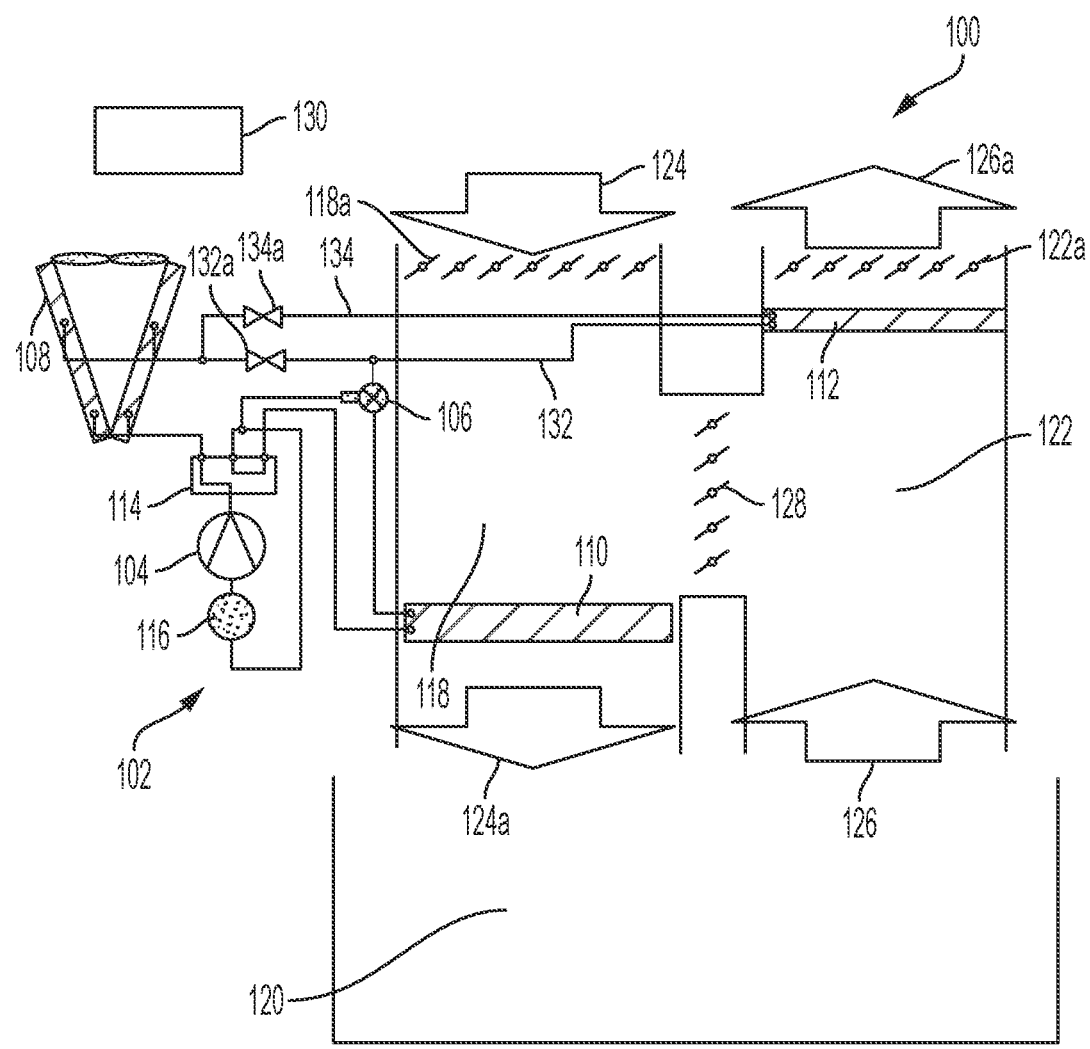
FIG. 1 is a block diagram of an exemplary HVAC system that can implement thermodynamic heat recovery in the cooling mode and the heating mode.

FIG. 1 is a schematic illustration of an exemplary HVAC system 100. HVAC system 100 is a vapor-compression system comprising a refrigerant circuit 102 that can implement a thermodynamic heat recovery process in the cooling mode and the heating mode. HVAC system 100 may be implemented for example as a rooftop unit.

Refrigerant circuit 102 includes a compressor 104, an expansion valve 106, an outdoor heat exchanger 108, an indoor heat exchanger 110, a recovery heat exchanger 112, and a reversing valve 114 (e.g., 4-way valve), operable between a cooling mode to direct the refrigerant 116 from the compressor in a direction from the outdoor heat exchanger to the indoor heat exchanger and a heating mode to direct the refrigerant from the compressor in the direction from the indoor heat exchanger to the outdoor heat exchanger. Recovery heat exchanger 112 utilizes the same compressor 104 as the outdoor and indoor heat exchangers.

Indoor heat exchanger 110 is positioned in a fresh air inlet 118 (e.g., duct) to the conditioned space 120 (e.g., enclosure). Recovery heat exchanger 112 is located in an extracted air outlet 122 (e.g., duct) from conditioned space 120. Dampers 118a control flow of fresh air 124 into the fresh air inlet 118 and conditioned space 120. Dampers 122a selectively allow all or a portion of the indoor air 126, shown as exhausted air 126a, to be exhausted from the condition space through extracted air outlet 122. Cross-dampers 128 selectively allow indoor air 126 to recirculate into fresh air inlet 118.

An electronic controller 130 comprising computer-readable storage medium may be in communication for example with compressor 104, reversing valve 114, dampers 118a, 122a, and 128, and various valves to operate the HVAC system in various modes including without limitation, a cooling mode, a heating mode, thermodynamic heat recovery mode, and deicing mode.

In an exemplary embodiment, a first refrigerant line 132 and a second refrigerant line 134 extends from outdoor heat exchanger 108 to recovery heat exchanger 112. A first valve 132a is positioned in the first refrigerant line 132 with expansion valve 106 in communication with first refrigerant line 132 between first valve 132a and recovery heat exchanger 112. In an exemplary embodiment, second refrigerant line 134 includes a valve 134a.

Figure 2:
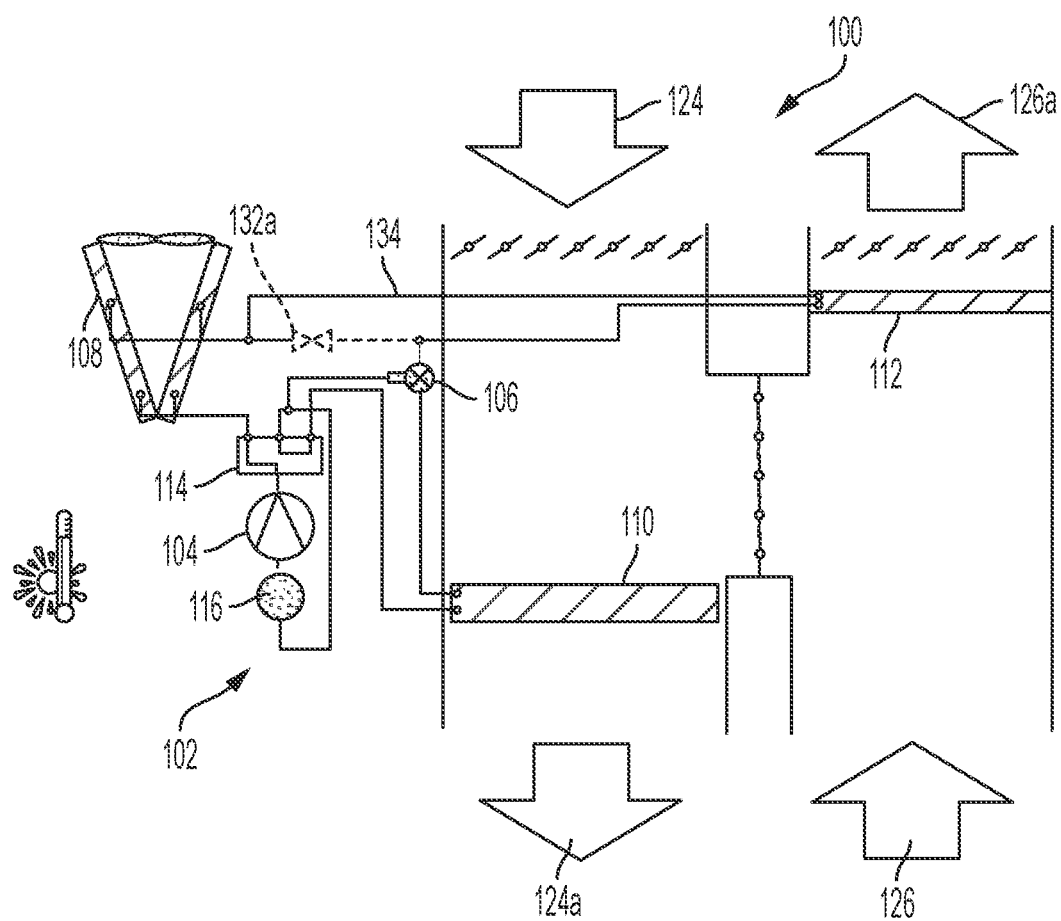
FIG. 2 is a block diagram of an exemplary HVAC system in a cooling mode with thermodynamic heat recovery.
Figure 2A:
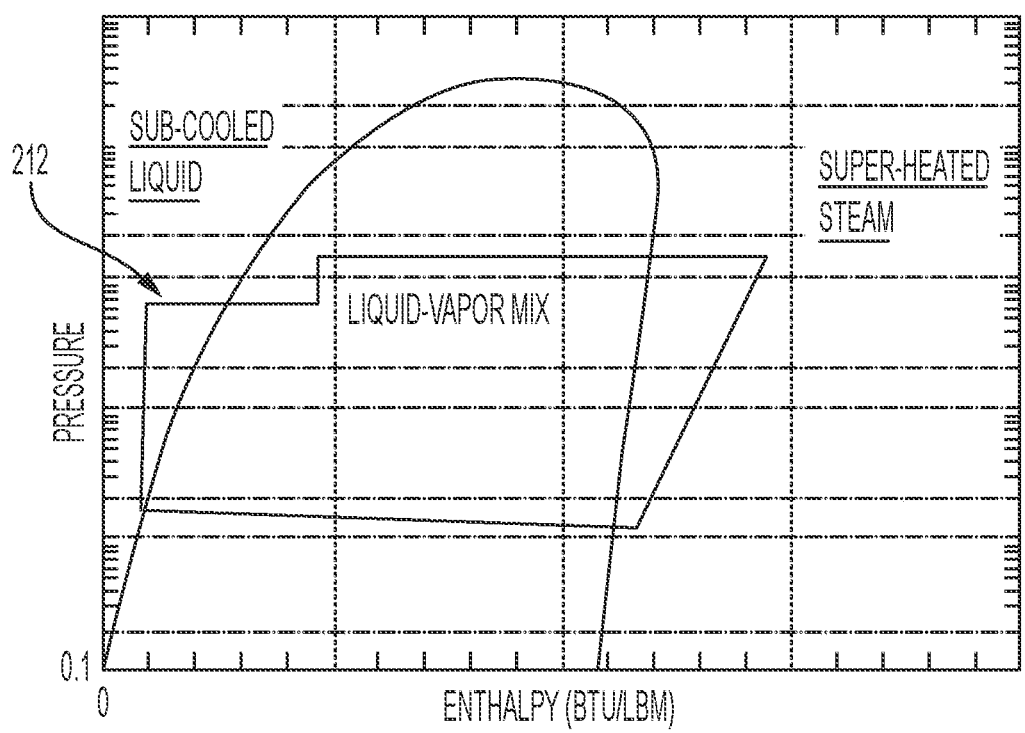
FIG. 2A illustrates an exemplary vapor-compression cycle of the refrigeration circuit of FIG. 2.

FIG. 2 schematically illustrates an exemplary HVAC system 100 in the cooling mode with thermodynamic heat recovery. FIG. 2A illustrates an exemplary vapor-compression cycle of refrigeration circuit 102 of FIG. 2. Refrigerant 116 is compressed by compressor 104 and directed through reversing valve 114 to outdoor heat exchanger 108 where it releases heat and is cooled. First valve 132a is closed directing the refrigerant from the outdoor heat exchanger through second refrigerant line 134 to recovery heat exchanger 112. Indoor air 126 passes across recovery heat exchanger 112 subcooling the refrigerant as illustrated in FIG. 2A at portion 212. The refrigerant flows from recovery heat exchanger 112 through expansion valve 106 to indoor heat exchanger 110 and then returns to the suction side of compressor 104. Fresh air 124 passes across indoor heat exchanger 110, wherein the refrigerant absorbs heat, resulting in cooler conditioned air 124a that passes into the conditioned space.

Figure 3:
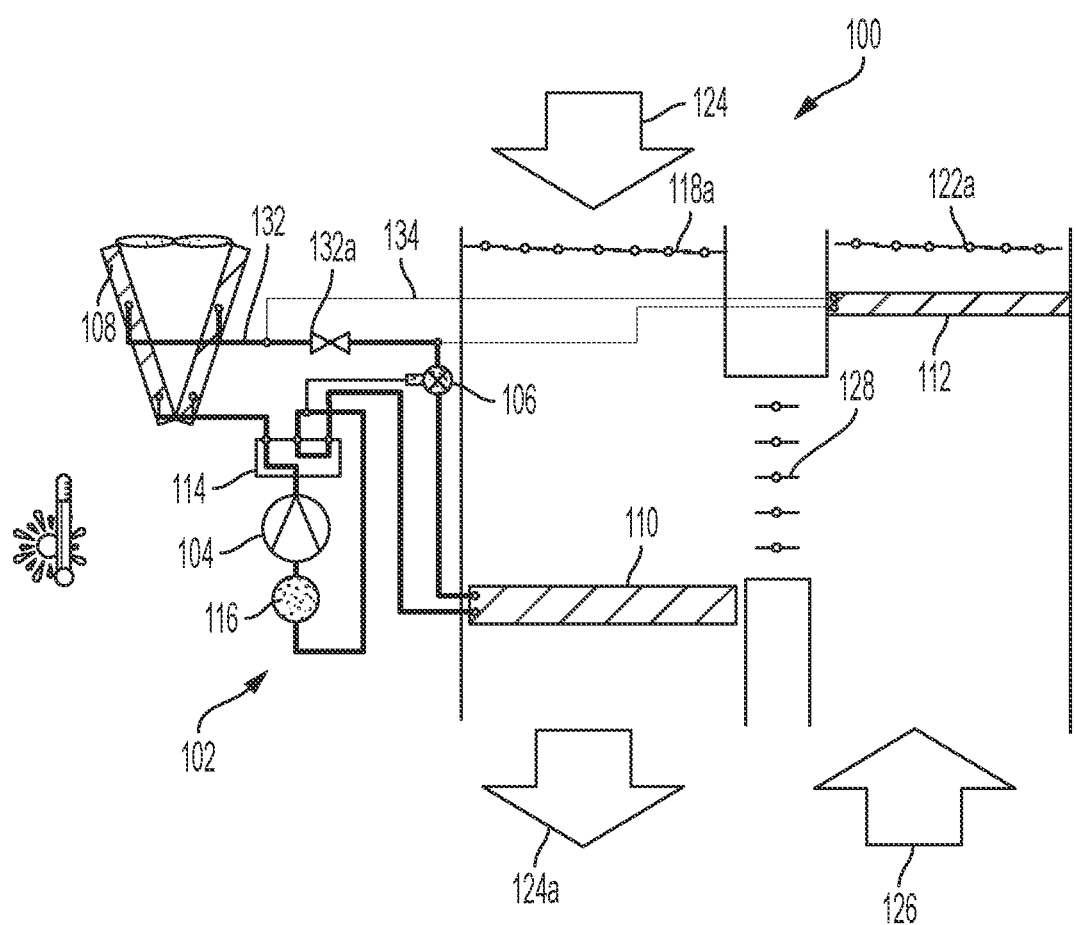
FIG. 3 is a block diagram of an exemplary HVAC system in cooling mode with total air recirculation.

FIG. 3 illustrates an exemplary HVAC system 100 in the cooling mode with total air recirculation. In this example, dampers 118a, 122a are closed and cross-dampers 128 are open resulting in substantially zero percent fresh air and 100% recirculation of indoor air 126. The refrigerant is directed from compressor 104 to outdoor heat exchanger 108. First valve 132a is open and the refrigerant is directed through first refrigerant line 132 and expansion valve 106 to indoor heat exchanger 110. If second refrigerant line 134 does not include a valve, e.g., valve 134a shown in FIG. 3, substantially all of the refrigerant will be directed through first line 132 due to the lower pressure drop and a very low flow rate of refrigerant may pass through second refrigerant line 134 and recovery heat exchanger 112. If second refrigerant line 134 has a valve 134a (FIG. 1) it may be closed to eliminate the low flow rate through the recovery heat exchanger and prevent heat pickup through the recover heat exchanger.

Figure 4:
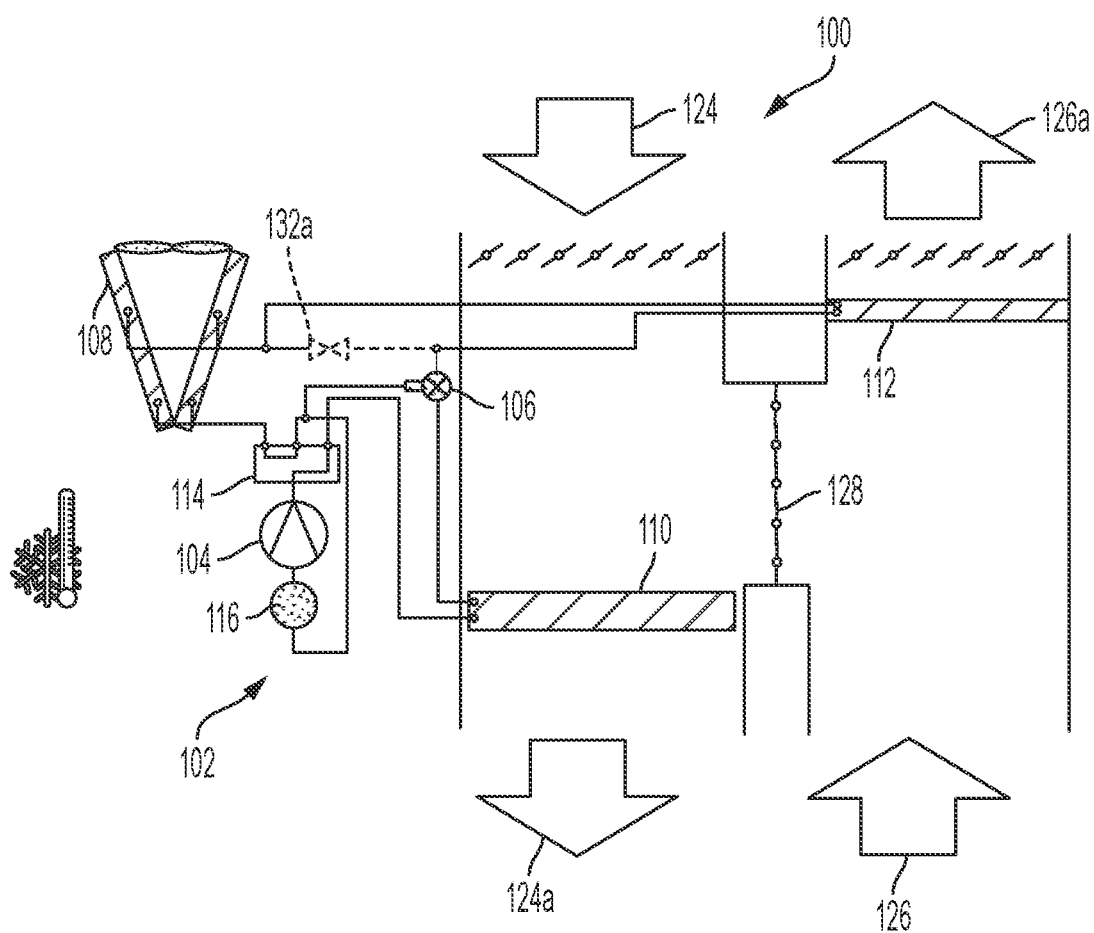
FIG. 4 is a block diagram of an exemplary HVAC system in heating mode with thermodynamic heat recovery.
Figure 4A:
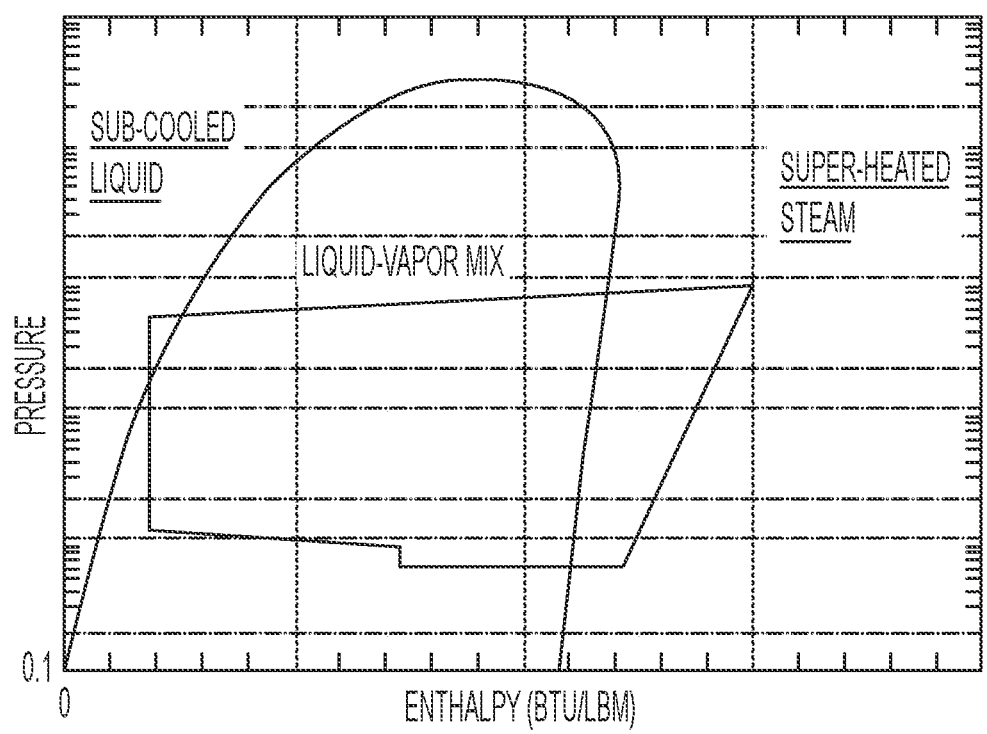
FIG. 4A illustrates an exemplary vapor-compression cycle of the refrigeration circuit of FIG. 4.

FIG. 4 schematically illustrates an exemplary HVAC system 100 in the heating mode with thermodynamic heat recovery. FIG. 4A illustrates an exemplary vapor-compression cycle of refrigeration circuit 102 of FIG. 4. Refrigerant 116 is compressed by compressor 104 and directed through reversing valve 114 to indoor heat exchanger 110 where the refrigerant releases heat to conditioned air 124a. First valve 132a is closed directing the refrigerant from the indoor heat exchanger to recovery heat exchanger 112 where the refrigerant absorbs heat from indoor air 126. The refrigerant flows from recovery heat exchanger 112 to outdoor heat exchanger 108.

Figure 5:
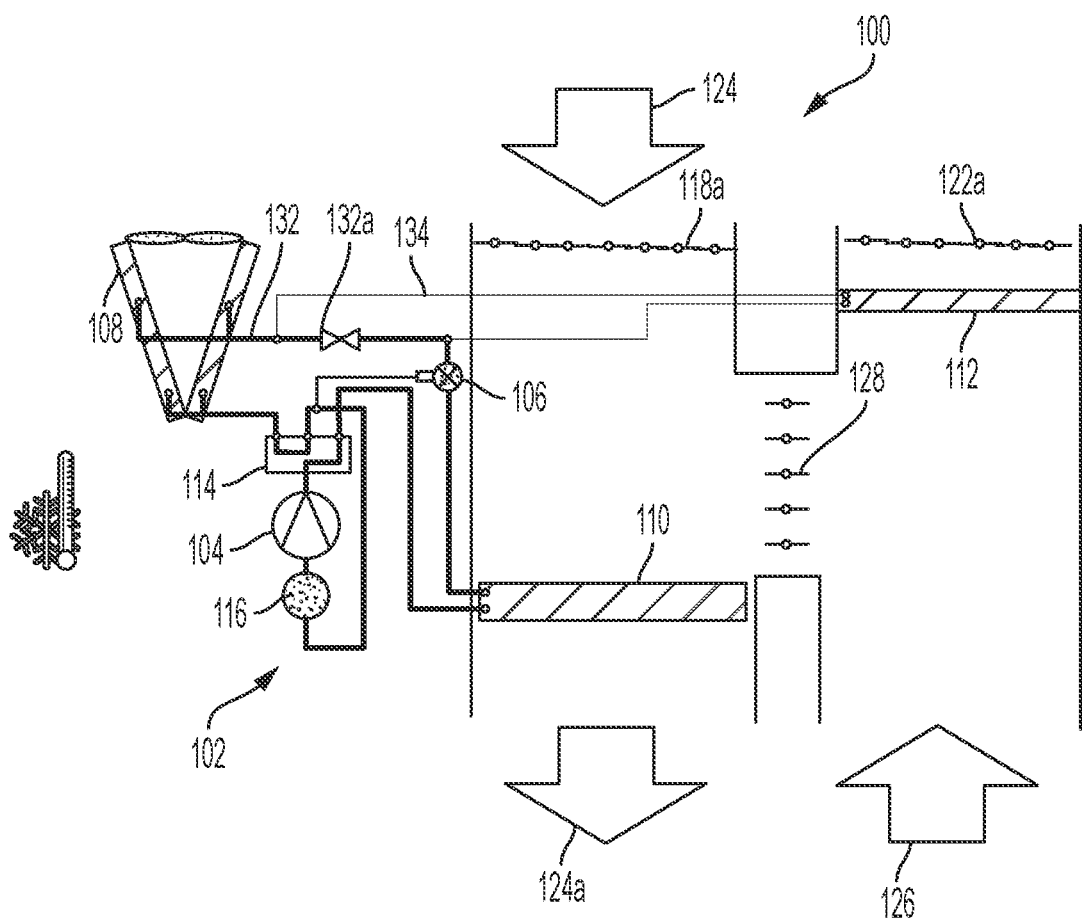
FIG. 5 is a block diagram of an exemplary HVAC system in cooling mode with total air recirculation.

FIG. 5 illustrates an exemplary an exemplary HVAC system 100 in the heating mode with total air recirculation. In this example, dampers 118a, 122a are closed and cross-dampers 128 are open resulting in substantially zero percent fresh air 124 and 100% recirculation of indoor air 126. The refrigerant is directed from compressor 104 through reversing valve 114 to indoor heat exchanger 110. First valve 132a is open and the refrigerant is directed through expansion valve 106 to outdoor heat exchanger 108. If second refrigerant line 134 does not include a valve, a very low flow rate of refrigerant may pass through recovery heat exchanger 112 as the refrigerant will primarily be directed through first line 132 due to the lower pressure drop. If second refrigeration line 134 has a valve 134a (FIG. 1) it may be closed to eliminate the low flow rate through the recovery heat exchanger and prevent a liquid refrigerant trap if inside temperature is colder than outside temperature in the condensing unit.

FIGS. 6-11 illustrate an exemplary HVAC system 100 with additional piping to facilitate position the heat recovery heat exchanger in the vapor-compression cycle for subcooling and for superheating heat transfer, where the temperature pinch is higher, in particular in heating mode. In some embodiments, the external and indoor heat exchangers may be maintained in counter-current flow.

Figure 6:
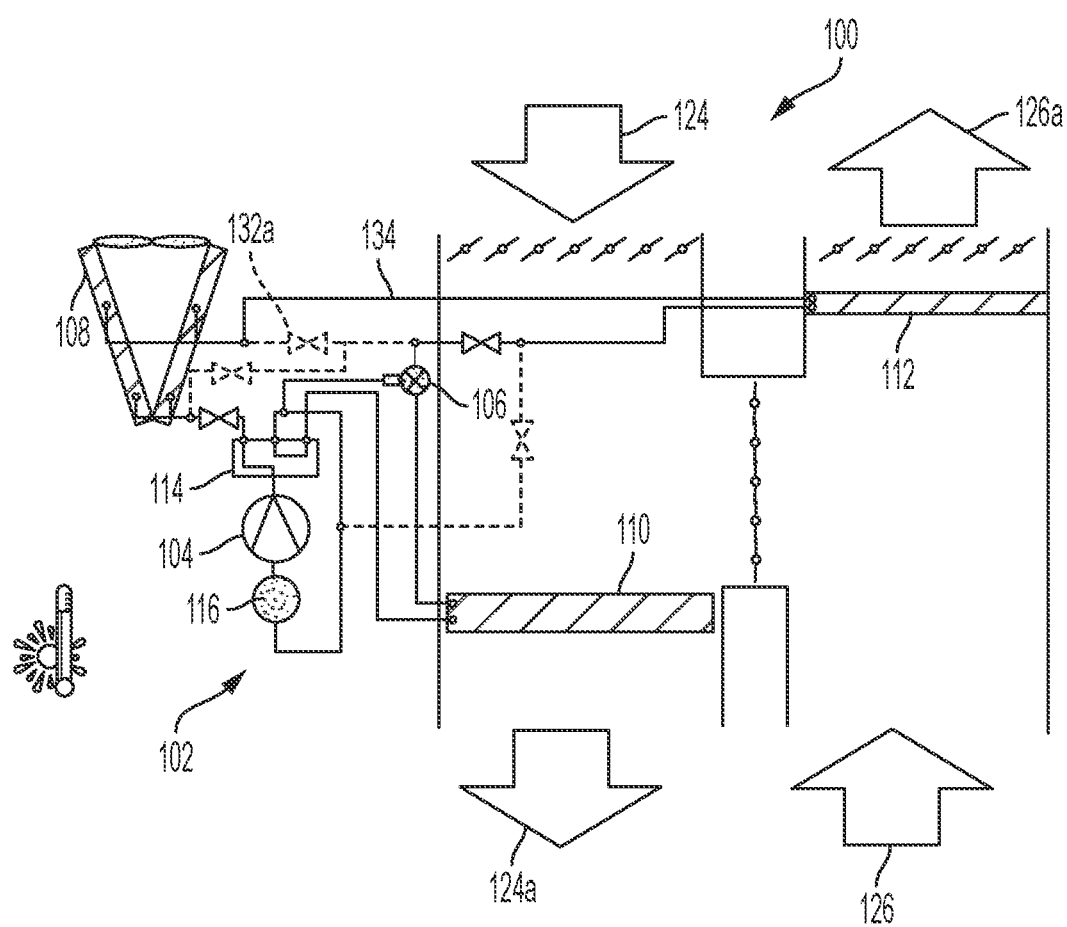
FIG. 6 is a block diagram of an exemplary HVAC system in cooling mode with thermodynamic heat recovery.
Figure 6A:
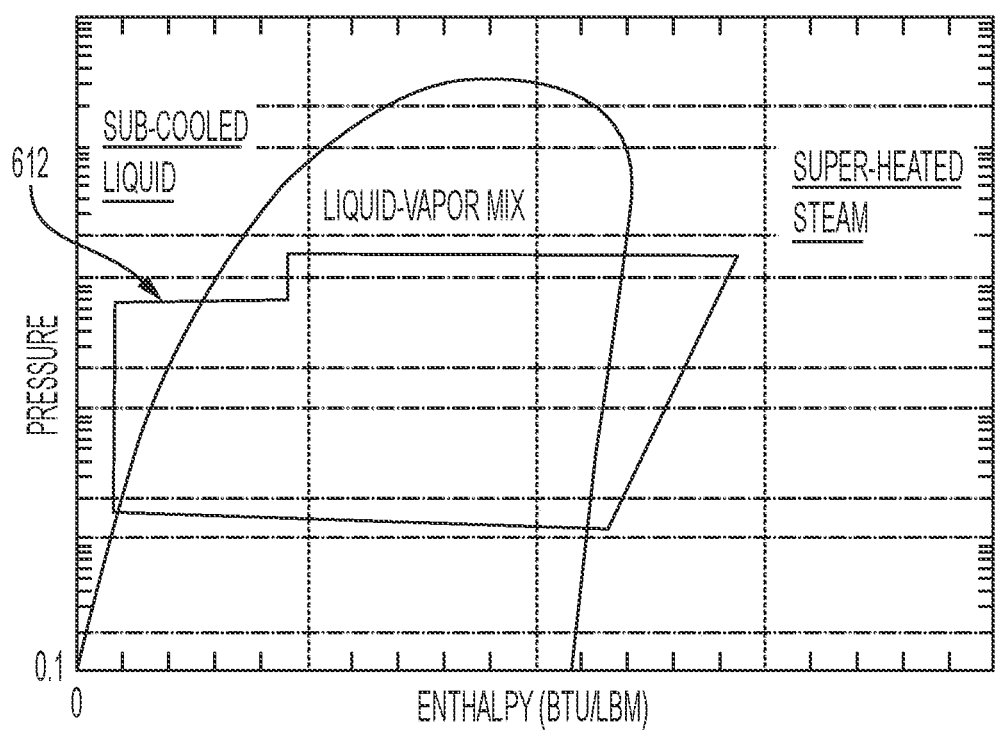
FIG. 6A illustrates an exemplary vapor-compression cycle of the refrigeration circuit of FIG. 6.

FIG. 6 schematically illustrates an exemplary HVAC system 100 in the cooling mode with the recovery heat exchanger 112 utilized to subcool the refrigerant. FIG. 6A illustrates an exemplary vapor-compression cycle of refrigeration circuit 102 of FIG. 6. Refrigerant 116 is compressed by compressor 104 and directed through reversing valve 114 to outdoor heat exchanger 108 where it releases heat and is cooled. Outdoor heat exchanger 108 and recovery heat exchanger 112 may be in counter-current flow. First valve 132a is closed, directing the refrigerant from the outdoor heat exchanger through second refrigerant line 134 to recovery heat exchanger 112. Indoor air 126 passes across recovery heat exchanger 112 subcooling the refrigerant as illustrated in FIG. 6A at portion 612. The refrigerant flows from recovery heat exchanger 112 through expansion valve 106 to indoor heat exchanger 110 and then returns to the suction side of compressor 104. Fresh air 124 passes across indoor heat exchanger 110, wherein the refrigerant absorbs heat, resulting in cooler conditioned air 124a introduced into the conditioned space. In FIG. 6, the refrigerant enters the bottom of outdoor heat exchanger 108 and exits the top of heat exchanger 108.

Figure 7:
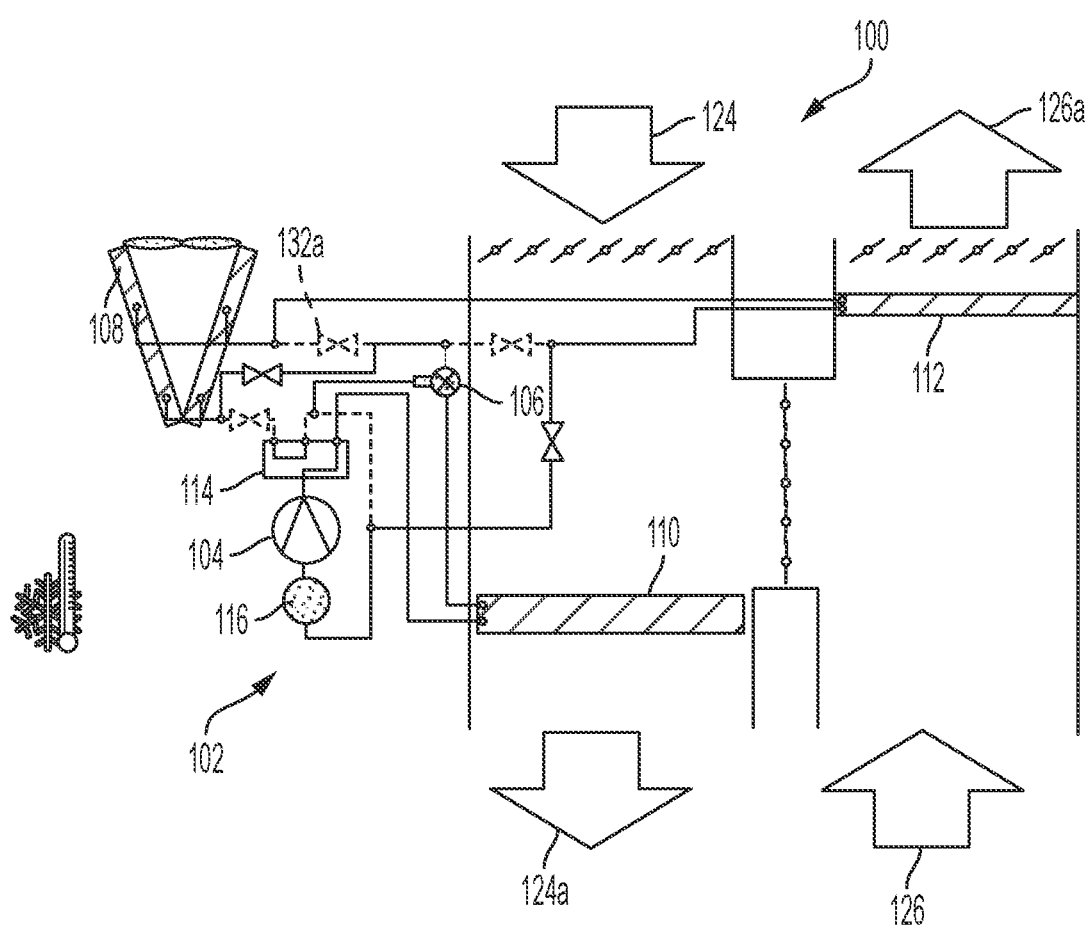
FIG. 7 is a block diagram of an exemplary HVAC system in heating mode with thermodynamic heat recovery and a recovery heat exchanger superheating the refrigerant.
Figure 7A:
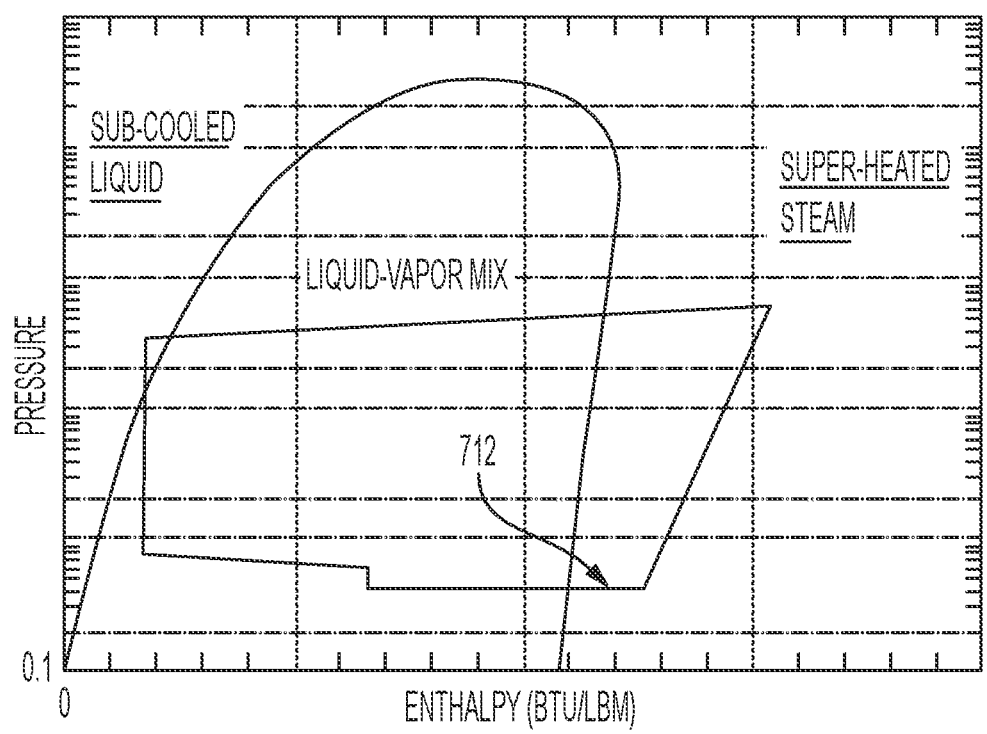
FIG. 7A illustrates an exemplary vapor-compression cycle of the refrigeration circuit of FIG. 7.

FIG. 7 schematically illustrates an exemplary HVAC system 100 in the heating mode with thermodynamic heat recovery and recovery heat exchanger 112 superheating the refrigerant. FIG. 7A illustrates an exemplary vapor-compression cycle of refrigeration circuit 102 of FIG. 7. Refrigerant 116 is compressed by compressor 104 and directed through reversing valve 114 to indoor heat exchanger 110 where the refrigerant releases heat to the conditioned air 124a. First valve 132a is closed directing the refrigerant from the indoor heat exchanger 110 to outdoor heat exchanger 108 where it absorbs heat from the cool outdoor air. The refrigerant is directed from the outdoor heat exchanger 108 to the recovery heat exchanger 112, where indoor air 126, which is already heated, is utilized as the hot source to superheat the refrigerant as illustrated in FIG. 7A at portion 712. With reference to the system in FIG. 4, the system in FIG. 7 reverses the order of the outdoor heat exchanger and the recovery heat exchanger in the refrigerant circuit and the vapor-compression cycle, producing a more efficient system. Using the heated indoor air as the hot source for superheating is more efficient than using the outdoor air as the hot source for superheating. In the heating mode illustrated in FIG. 7, the refrigerant flows in the same direction through outdoor heat exchanger 108 as in the cooling mode illustrated in FIG. 6. For example, the outdoor heat exchanger is in counter-current flow in the heating mode (FIG. 7) and the cooling mode (FIG. 6).

Figure 8:
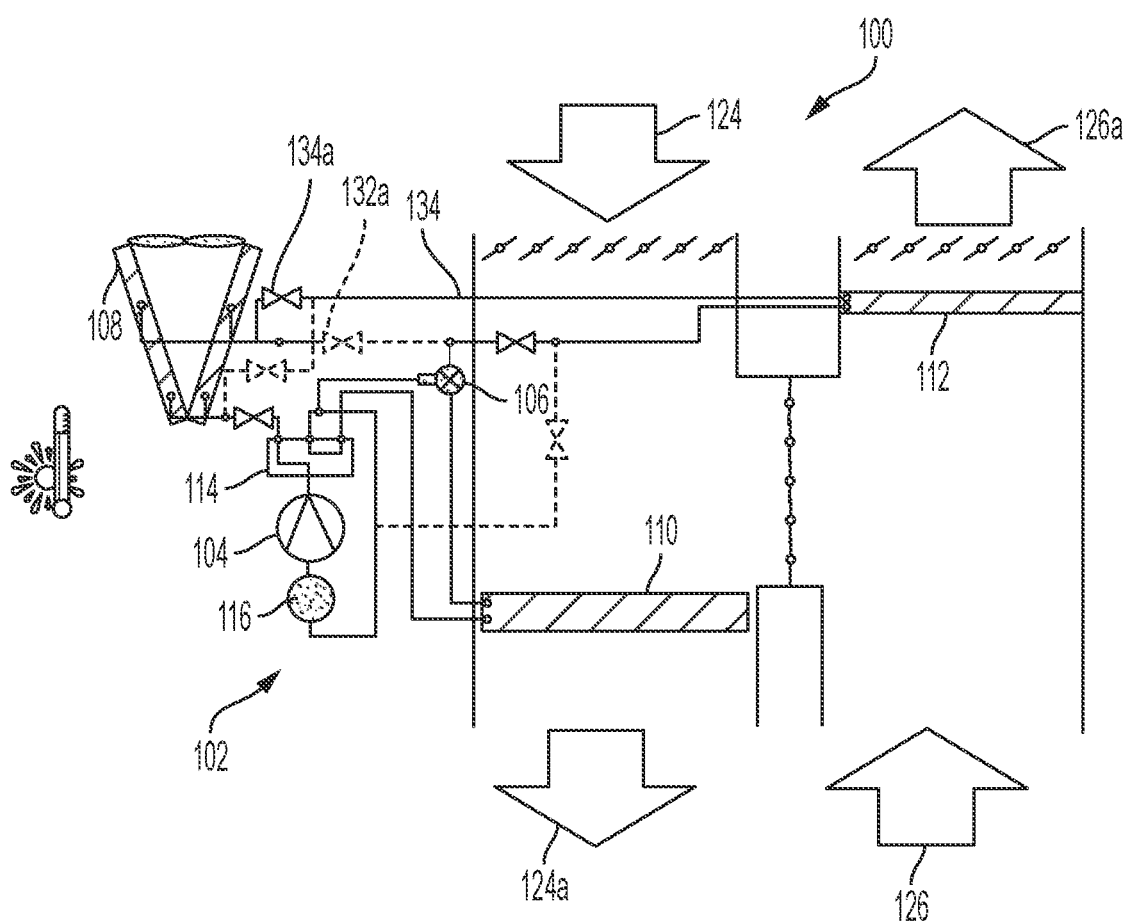
FIG. 8 is a block diagram of an exemplary HVAC system in cooling mode with thermodynamic heat recovery.

FIG. 8 schematically illustrates an exemplary HVAC system 100 in the cooling mode with the recovery heat exchanger 112 utilized to subcool the refrigerant. Refrigerant 116 is compressed by compressor 104 and directed through reversing valve 114 to outdoor heat exchanger 108 where it releases heat and is cooled. Outdoor heat exchanger 108 may be co-current flow or counter-current flow. First valve 132a is closed, directing the refrigerant from the outdoor heat exchanger through second refrigerant line 134 to recovery heat exchanger 112. Indoor air 126 passes across recovery heat exchanger 112 subcooling the refrigerant, see e.g., portion 612 in FIG. 6A. The refrigerant flows from recovery heat exchanger 112 through expansion valve 106 to indoor heat exchanger 110 and then returns to the suction side of compressor 104. Fresh air 124 passes across indoor heat exchanger 110, wherein the refrigerant absorbs heat, resulting in cooler conditioned air 124a introduced into the conditioned space.

Figure 9:
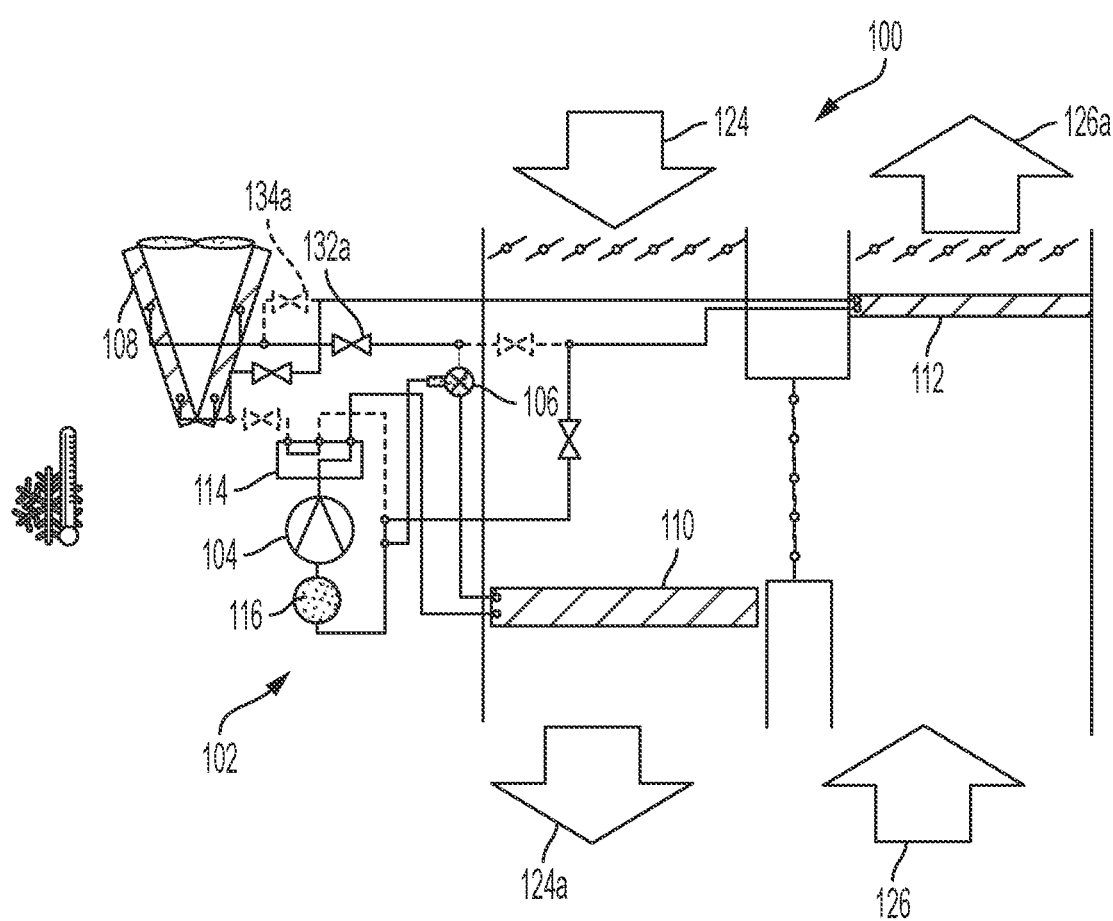
FIG. 9 is a block diagram of an exemplary HVAC system in heating mode with thermodynamic heat recovery and a recovery heat exchanger superheating the refrigerant.

FIG. 9 schematically illustrates an exemplary HVAC system 100 in the heating mode with thermodynamic heat recovery and recovery heat exchanger 112 superheating the refrigerant. Refrigerant 116 is compressed by compressor 104 and directed through reversing valve 114 to indoor heat exchanger 110 where the refrigerant releases heat to the conditioned air 124a. First valve 132a is opened directing the refrigerant from indoor heat exchanger 110 to outdoor heat exchanger 108 where it absorbs heat from the cool outdoor air. First valve 132a is opened, as opposed to closed in FIG. 7, directing the refrigerant into the top of outdoor heat exchanger 108, as opposed to the bottom in FIG. 7. The refrigerant is directed from the outdoor heat exchanger 108 to recovery heat exchanger 112 where indoor air 126, which is already heated, is utilized as the hot source to superheat the refrigerant as illustrated in FIG. 7A at portion 712.

Figure 10:
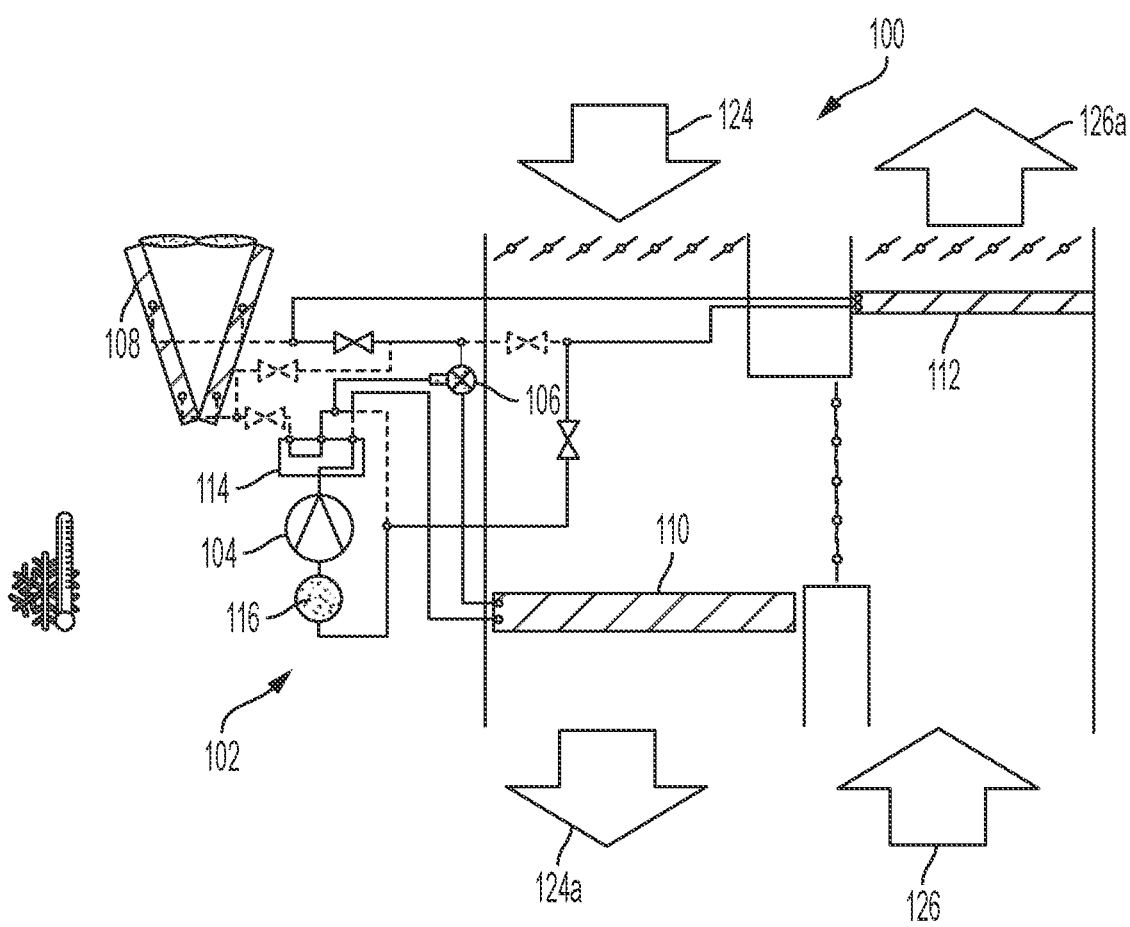
FIG. 10 is a block diagram of an exemplary HVAC system in heating mode without using an outdoor heat exchanger.
Figure 10A:
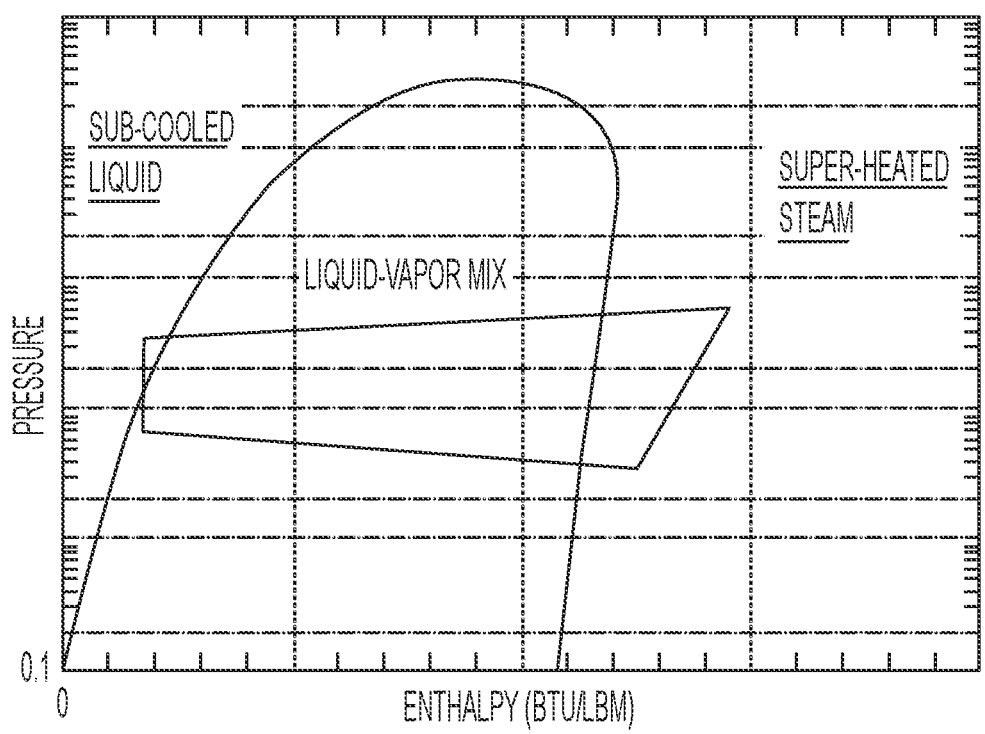
FIG. 10A illustrates an exemplary vapor-compression cycle of the refrigeration circuit of FIG. 10.

FIG. 10 schematically illustrates an exemplary HVAC system 100 in the heating mode without using outdoor heat exchanger 108. This mode may be suited for cold environments, for example about 0 C or lower and inside air 126 has been heated. FIG. 10A illustrates an exemplary vapor-compression cycle of refrigeration circuit 102 of FIG. 10.

Refrigerant 116 is directed from compressor 104 through reversing valve 114 to indoor heat exchanger 110 where the fresh air 124 absorbs heat from the refrigerant and is pushed into the conditioned space as heated conditioned air 124a. The refrigerant flows from the indoor heat exchanger through the expansion valve 106 to recovery heat exchanger 112 where the indoor air 126 heats the refrigerant which is directed to the compressor. FIG. 10A illustrates that it is possible to fit the compressor operating map even with fresh air at low ambient temperature.

Figure 11:
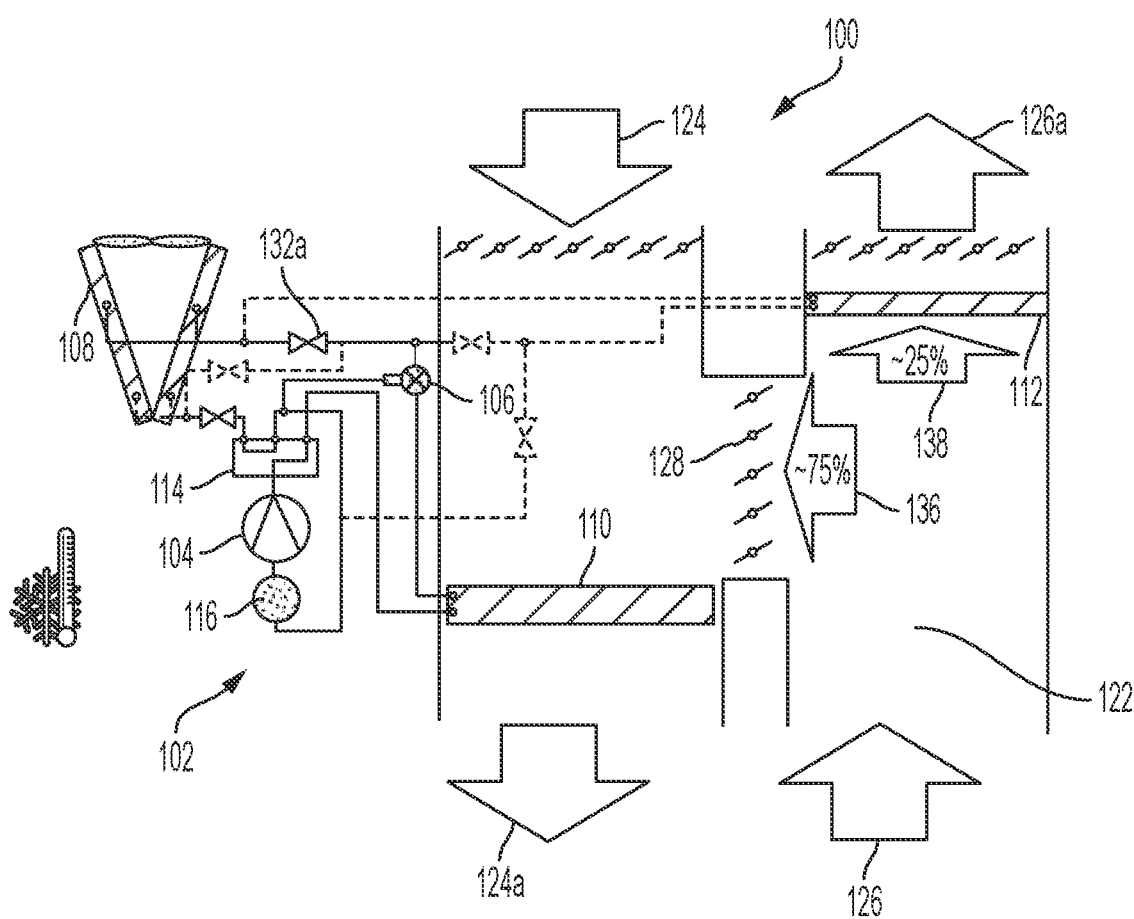
FIG. 11 is a block diagram of an exemplary HVAC system in a deicing mode.

FIG. 11 schematically illustrates an HVAC system 100 in a deicing mode at low ambient temperature without any, or limited, impact on thermal comfort. A first portion 136 of indoor air 126, which is warm, is recirculated from the extracted air outlet 122 through cross-dampers 128 to fresh air inlet 118 upstream of indoor heat exchanger 110. The second portion 138 of indoor air 126 is directed across recovery heat exchanger 112 melting ice that may have accumulated. The refrigerant is directed from compressor 104 to indoor heat exchanger 110, where the mixture of fresh air 124 and first indoor air portion 136 absorbs heat from the refrigerant. The refrigerant is directed from indoor heat exchanger through expansion valve 106 to outdoor heat exchanger 108 and back to compressor 104, bypassing recovery heat exchanger 112.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within 10% of" what is specified.

For purposes of this disclosure, the term computer-readable storage medium encompasses one or more tangible computer-readable storage media possessing structures. As an example and not by way of limitation, a computer-readable storage medium may include a semiconductor-based or other integrated circuit (IC) (such as, for example, a field-programmable gate array (FPGA) or an application-specific IC (ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of a controller as appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

In this patent application, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A refrigerant circuit, comprising:
   a compressor operable to compress a refrigerant;
   an expansion valve;
   an outdoor heat exchanger;
   an indoor heat exchanger in a fresh air inlet to a conditioned space;
   a recovery heat exchanger in an extracted air outlet from the conditioned space;
   a reversing valve operable to control a direction of refrigerant flow between a cooling mode and a heating mode; and
   wherein the outdoor heat exchanger is in counter-current flow in the heating mode and the cooling mode.

2. The refrigerant circuit of claim 1, wherein the refrigerant circuit comprises:
   a first refrigerant line extending from the outdoor heat exchanger and the recovery heat exchanger;
   a second refrigerant line extending from the outdoor heat exchanger to the recovery heat exchanger; and
   a first valve located in the first refrigerant line, in a closed position the first valve directing the refrigerant through the recovery heat exchanger.

3. The refrigerant circuit of claim 2, wherein the expansion valve is in communication with the first refrigerant line between the first valve and the recovery heat exchanger.

4. The refrigerant circuit of claim 3, further comprising a second valve in the second refrigerant line.

5. The refrigerant circuit of claim 1, wherein the recovery heat exchanger is located in the refrigerant circuit between the outdoor heat exchanger and the indoor heat exchanger and in the cooling mode the refrigerant flows from the compressor through the reversing valve to the outdoor heat exchanger, from the outdoor heat exchanger to the recovery heat exchanger, from the recovery heat exchanger through the expansion valve to the indoor heat exchanger, and from the indoor heat exchanger to the compressor.

6. The refrigerant circuit of claim 1, wherein the recovery heat exchanger is located in the refrigerant circuit between the outdoor heat exchanger and the indoor heat exchanger and in the heating mode the refrigerant flows from the compressor through the reversing valve to the indoor heat exchanger, from the indoor heat exchanger through the expansion valve to the recovery heat exchanger, from the recovery heat exchanger to the outdoor heat exchanger, and from the outdoor heat exchanger to the compressor.

7. The refrigerant circuit of claim 1, wherein in the heating mode the refrigerant flows from the compressor through the reversing valve to the indoor heat exchanger, from the indoor heat exchanger through the expansion valve to the outdoor heat exchanger, from the outdoor heat exchanger to the recovery heat exchanger, and from the recovery heat exchanger to the compressor.

8. The refrigerant circuit of claim 1, wherein:
   the outdoor heat exchanger and the recovery heat exchanger have a reverse refrigerant flow direction in the heating mode relative to the cooling mode; and
   the outdoor heat exchanger and the recovery heat exchanger are both in co-current flow in one of the heating mode and the cooling mode.

9. A computer-program product comprising a non-transitory computer-usable medium having computer-readable program code embodied therein, the computer-readable program code adapted to be executed to implement a method, the method comprising:
   operating a refrigerant circuit in a cooling mode or a heating mode to condition an indoor air in a conditioned space, the refrigerant circuit comprising a compressor operable to compress a refrigerant, an expansion valve, an outdoor heat exchanger, an indoor heat exchanger in a fresh air inlet to the conditioned space, and a recovery heat exchanger in an extracted air outlet from the conditioned space;

recovering energy from the indoor air via the recovery heat exchanger, the recovering energy comprises at least one of subcooling the refrigerant with the recovery heat exchanger; and performing a deicing procedure, the deicing procedure comprising:

recirculating a first portion of the indoor air from the extracted air outlet, downstream of the recovery heat exchanger, to the fresh air inlet, upstream of the indoor heat exchanger;

directing a second portion of the indoor air across the recovery heat exchanger;

directing the refrigerant from the indoor heat exchanger through the expansion valve to the outdoor heat exchanger; and directing the refrigerant from the outdoor heat exchanger to the compressor bypassing the recovery heat exchanger.

10. The computer-program product of claim 9, wherein the method of recovering energy comprises at least one of:

subcooling the refrigerant with the recovery heat exchanger; and superheating the refrigerant with the recovery heat exchanger.

11. The computer-program product of claim 9, the method further comprising, when operating in the cooling mode:

directing the refrigerant from the compressor to the outdoor heat exchanger;

removing heat from the refrigerant at the outdoor heat exchanger;

directing the refrigerant from the outdoor heat exchanger to the recovery heat exchanger;

removing heat from the refrigerant at the recovery heat exchanger;

directing the refrigerant from the recovery heat exchanger to the expansion valve and the indoor heat exchanger;

adding heat to the refrigerant at the indoor heat exchanger; and directing the refrigerant from the indoor heat exchanger to the compressor.

12. The computer-program product of claim 11, wherein the outdoor heat exchanger and the recovery heat exchanger have a reverse refrigerant flow direction in the heating mode relative to the cooling mode; and the outdoor heat exchanger and the recovery heat exchanger are both in counter-current flow in one of the heating mode and the cooling mode and in co-current flow in the other one of the heating mode and the cooling mode.

13. The computer-program product of claim 11, wherein the outdoor heat exchanger is in counter-current flow in the heating mode and the cooling mode.

14. The computer-program product of claim 9, the method further comprising, when operating in the heating mode:

directing the refrigerant from the compressor to the indoor heat exchanger;

removing heat from the refrigerant at the indoor heat exchanger;

directing the refrigerant from the indoor heat exchanger through the expansion valve to the recovery heat exchanger;

adding heat to the refrigerant at the recovery heat exchanger;

directing the refrigerant from the recovery heat exchanger to the outdoor heat exchanger;

adding heat to the refrigerant at the outdoor heat exchanger; and directing the refrigerant from the outdoor heat exchanger to the compressor.

15. The computer-program product of claim 9, the method further comprising:

when operating in the cooling mode:

directing the refrigerant from the compressor to the outdoor heat exchanger;

removing heat from the refrigerant at the outdoor heat exchanger;

directing the refrigerant from the outdoor heat exchanger to the recovery heat exchanger;

removing heat from the refrigerant at the recovery heat exchanger;

directing the refrigerant from the recovery heat exchanger to the expansion valve and the indoor heat exchanger;

adding heat to the refrigerant at the indoor heat exchanger; and directing the refrigerant from the indoor heat exchanger to the compressor; and when operating in the heating mode:

directing the refrigerant from the compressor to the indoor heat exchanger;

removing heat from the refrigerant at the indoor heat exchanger;

directing the refrigerant from the indoor heat exchanger through the expansion valve to the recovery heat exchanger;

adding heat to the refrigerant at the recovery heat exchanger;

directing the refrigerant from the recovery heat exchanger to the outdoor heat exchanger;

adding heat to the refrigerant at the outdoor heat exchanger; and directing the refrigerant from the outdoor heat exchanger to the compressor.

16. The computer-program product of claim 9, the method further comprising, when operating in the heating mode:

directing the refrigerant from the compressor to the indoor heat exchanger;

removing heat from the refrigerant at the indoor heat exchanger;

directing the refrigerant from the indoor heat exchanger through the expansion valve to the outdoor heat exchanger;

adding heat to the refrigerant at the outdoor heat exchanger;

directing the refrigerant from the outdoor heat exchanger to the recovery heat exchanger;

adding heat to the refrigerant at the recovery heat exchanger; and directing the refrigerant from the recovery heat exchanger to the compressor.

17. The computer-program product of claim 16, wherein the refrigerant from the outdoor heat exchanger is superheated by the indoor air at the recovery heat exchanger.

18. The computer-program product of claim 9, the method further comprising:

when operating in the cooling mode:

directing the refrigerant from the compressor to the outdoor heat exchanger;

removing heat from the refrigerant at the outdoor heat exchanger;

directing the refrigerant from the outdoor heat exchanger to the recovery heat exchanger;
removing heat from the refrigerant at the recovery heat exchanger;
directing the refrigerant from the recovery heat exchanger to the expansion valve and the indoor heat exchanger;
adding heat to the refrigerant at the indoor heat exchanger; and
directing the refrigerant from the indoor heat exchanger to the compressor; and when operating in the heating mode:
directing the refrigerant from the compressor to the indoor heat exchanger;
removing heat from the refrigerant at the indoor heat exchanger;
directing the refrigerant from the indoor heat exchanger through the expansion valve to the outdoor heat exchanger;
adding heat to the refrigerant at the outdoor heat exchanger;
directing the refrigerant from the outdoor heat exchanger to the recovery heat exchanger;
adding heat to the refrigerant at the recovery heat exchanger; and
directing the refrigerant from the recovery heat exchanger to the compressor.

19. The computer-program product of claim 9, the method further comprising, when operating in the heating mode:
directing the refrigerant from the compressor to the indoor heat exchanger;
removing heat from the refrigerant at the indoor heat exchanger;
directing the refrigerant from the indoor heat exchanger through the expansion valve to the recovery heat exchanger bypassing the outdoor heat exchanger;
heating the refrigerant at the recovery heat exchanger; and
directing the refrigerant from the recovery heat exchanger to the compressor.

\* \* \* \* \*